United States Patent

Klein

Patent Number: 6,001,222
Date of Patent: Dec. 14, 1999

[54] SOLAR HEATING AND EVAPORATION PLANT

[76] Inventor: Samuel H. Klein, 8/34 Hashayatim, Ashdod, Israel, 77441

[21] Appl. No.: 09/037,958

[22] Filed: Mar. 11, 1998

[51] Int. Cl.$^6$ .................................. B01D 3/02; C02F 1/14
[52] U.S. Cl. .................. 202/234; 159/903; 159/DIG. 15; 202/189; 202/267.1; 203/10; 203/86; 203/DIG. 1
[58] Field of Search .................... 202/234, 196, 202/193, 267.1, 155, 172, 173, 181, 186, 189; 203/10, 87, DIG. 1, DIG. 17, 71, 86; 159/903, 904, DIG. 15

[56] References Cited

U.S. PATENT DOCUMENTS

| | | |
|---|---|---|
| 2,213,894 | 9/1940 | Barry . |
| 2,820,744 | 1/1958 | Lighter . |
| 3,282,327 | 11/1966 | Hardy et al. . |
| 3,351,538 | 11/1967 | Andrassy . |
| 3,655,517 | 4/1972 | Hensley, Jr. et al. ................ 202/234 |
| 3,801,474 | 4/1974 | Castellucci et al. . |
| 3,870,605 | 3/1975 | Sakamoto . |
| 4,010,080 | 3/1977 | Tsay et al. . |
| 4,141,798 | 2/1979 | Grosse . |
| 4,235,679 | 11/1980 | Swaidan ........................ 203/DIG. 1 |
| 4,966,655 | 10/1990 | Wilkerson, Jr. . |
| 5,468,351 | 11/1995 | Hirota et al. . |
| 5,628,879 | 5/1997 | Woodruff ............................ 159/903 |

Primary Examiner—Virginia Manoharan

[57] ABSTRACT

A solar heating and evaporation plant is described which can be used to either produce distilled potable water from salty water or to heat water for industrial or domestic purposes. The plant includes a plurality of substantially equally spaced solar stills mounted on a black colored solid metallic heat conducting plate, each said solar still including: (a) a vertical, cylindrical container having a diameter of about 2 to 4 feet for holding a body of salty water in which the salty water has an exposed upper surface, said container having thin side walls with the inside and outside faces thereof being colored black; (b) a floating cover layer on said body of salty water including a black colored floating perforate plate or black colored floated particles; (c) an annular trough surrounding the top periphery of said cylindrical container, said trough for holding a transparent cover for the container and to collect condensed water; and (d) a transparent plastic cover including a lower vertical cylindrical portion which merges into a semi-spherical top portion, the transparent cover having a height greater than its diameter and for condensing water vapor and causing the condensed water to flow down the vertical cylindrical portion for collection in the annular trough.

10 Claims, 2 Drawing Sheets

SOLAR HEATING AND EVAPORATION PLANT

BACKGROUND OF THE INVENTION

This invention relates to solar heating and evaporation plants and, more particularly, to such plant comprised of a plurality of relatively small solar stills or heaters.

The art of producing drinking water from salt water by means of solar distillation is well known, particularly in arid, coastal regions. Many designs of solar stills are known which use conventional materials such as wood, metal, concrete, plastic, glass, etc. Typically, a material transparent to solar radiation is supported over a pool of salt or brackish water in such a manner as to allow the radiant energy to heat and vaporize the water. The vapor thus produced then condenses and the condensate coalesces into a body of distilled potable water.

Since the solar energy used to provide the heat of vaporization of the impure water is free, the economy and productivity of a solar still is tied primarily to the cost of construction and material.

As examples of prior solar heating systems, there may be mentioned U.S. Pat. No. 2,213,894, issued Sep. 3, 1940, which shows a solar water heater having a transparent dome-shaped top. This is used to heat a coil mounted within the dome.

U.S. Pat. No. 5,468,351, issued Nov. 21, 1995, shows a system with a tapered glass or plastic roof mounted over a liquid reservoir and associated with a liquid recovery member. The transparent roof has on its inner surface a saponified cellulose-based film.

Another solar evaporator is described in U.S. Pat. No. 3,282,327, issued Nov. 1, 1966, having an inclined glass roof and collection troughs for potable water. The surface of the impure water has particles of plastic material floating on the surface which serve to increase the evaporation rate of the water being heated by solar radiant energy.

Yet another solar distillation system is shown in U.S. Pat. No. 3,801,474, issued Apr. 2, 1974. This includes a rectangular container for salt water and a transparent plastic inclined roof portion sitting over the body of salt water. Potable water is collected in troughs around the perimeter of the roof section. Cellular glass nodules float on the surface of the salt water to enhance the evaporation efficiency.

It is the object of the present invention to provide further improvements to the general efficiency of solar heating and evaporation systems.

SUMMARY OF THE INVENTION

The present invention in its broadest aspect relates to a solar heating and evaporation plant which comprises a plurality of substantially equally spaced solar stills mounted on a black colored solid metallic heat conducting base or plate. Each solar still comprises a vertical, cylindrical container portion of relatively small size, e.g. a diameter of about 2 to 4 feet (0.6 to 1.2 m), for holding a body of salty water with the salty water having an exposed upper surface. This container has thin side walls, e.g. about 1 to 2 mm thick, with the inside and outside faces of the container walls being colored black.

A floating cover layer is provided on the body of salty water within the container and this is formed of a black colored floating perforate plate or black colored floating particles. This serves to enhance the rate of evaporation.

An annular trough surrounds the top periphery of the cylindrical container. This trough is adapted to hold a transparent cover for the container and to collect distilled potable water. The transparent cover comprises a lower vertical cylindrical portion which merges into a semi-spherical top portion. The transparent cover has a total height that is greater than the depth of salty water in the container, and it is adapted to condense water vapor and cause the condensed water vapor to immediately flow down the vertical cylindrical portions for collection in the annular trough.

It is advantageous for the salty water in the cylindrical container to have a substantial depth and the depth is preferably controlled by an overflow positioned to control the depth of salty water at a level which is greater than the diameter of the container. This salty water depth is preferably greater than the diameter of the cylindrical container.

The solar evaporation plant of this invention is designed to absorb the maximum amount of solar energy during the entire day and year per unit of horizontal surface area occupied by the plant. This is in part achieved by the combination of the relatively small individual solar stills substantially 0equally spaced on a black colored solid metallic heat conducting base or plate. To achieve the objects of the invention, the individual solar stills are spaced from each other by a distance of at least about 1.35 times the total height of the salty water container.

The immediate surrounding horizontal surface between the individual solar stills is black in color and formed of heat conducting material. This in effect creates an additional solar heat absorption surface for enhancing heat transfer to the bottom and the walls of the stills and the salty water.

The shape of the transparent cover for each solar still is also an important part of this invention. Thus, it is important that each transparent cover include a substantial lower vertical cylindrical portion and a semi-spherical top. This provides an efficient means for distilled potable water to flow down the interior vertical walls and collect in the trough. This arrangement also leaves only a very thin film of condensed water on the inside of the semi-spherical portion of the cover. The rays of the sun pass through the transparent cover and thin moisture film, causing steam vapor to increase its temperature and energy. The vertical height of the transparent cover can be substantial and is limited only by the cost of producing a unit volume of distilled water.

The black surface particles or porous plate floating on the salty water also act as an additional absorber of residual solar energy not absorbed by the steam vapor. The combined effect of the molecular vapor heat mass transfer and the absorption of solar radiation by the floating black surface has been found to significantly increase the distillation capacity of the still.

The surface particles must be (a) solid and non-toxic in nature, (b) capable of floating on the salty water, (c) capable of withstanding high water temperatures, (d) black in color and of inorganic material, (e) nonsoluble and inert in water and (f) a good conductor of heat energy. The particles may be made from a variety of plastic materials or from an inorganic material such as pumice or other mineral compounds or combinations of the above materials. The particles typically form a layer on the salty water 2 to 3 mm thick. When a porous plate is used, this may have a thickness of 2 to 3 mm in the form of cross linked polyethylene containing 30 to 40% by weight carbon black or nylon containing 20 to 30% by weight carbon black.

By providing vertical cylindrical transparent covers for the stills with a semi-spherical top, the distillation and condensation capacity are increased. This unique shape of the transparent covers also has the advantage that the covers do not cause shadows to fall on adjacent units. Therefore, all of the solar energy not radiating on a single solar unit is free to reach the other solar units of the group, including all horizontal and vertical black surfaces of the containers and the black horizontal solar absorption surfaces between the solar units.

While the above discussion has related primarily to the production of potable distilled water, the apparatus of this invention can also be used simply as a water heater. Thus, it can become a very economical source of hot water for either industrial or domestic purposes. In the water heater mode, it becomes primarily a heat absorber for heating a body of water.

The invention is further described by reference to the drawing figures as follows.

DESCRIPTION OF THE PREFERRED EMBODIMENTS

Figure 1:
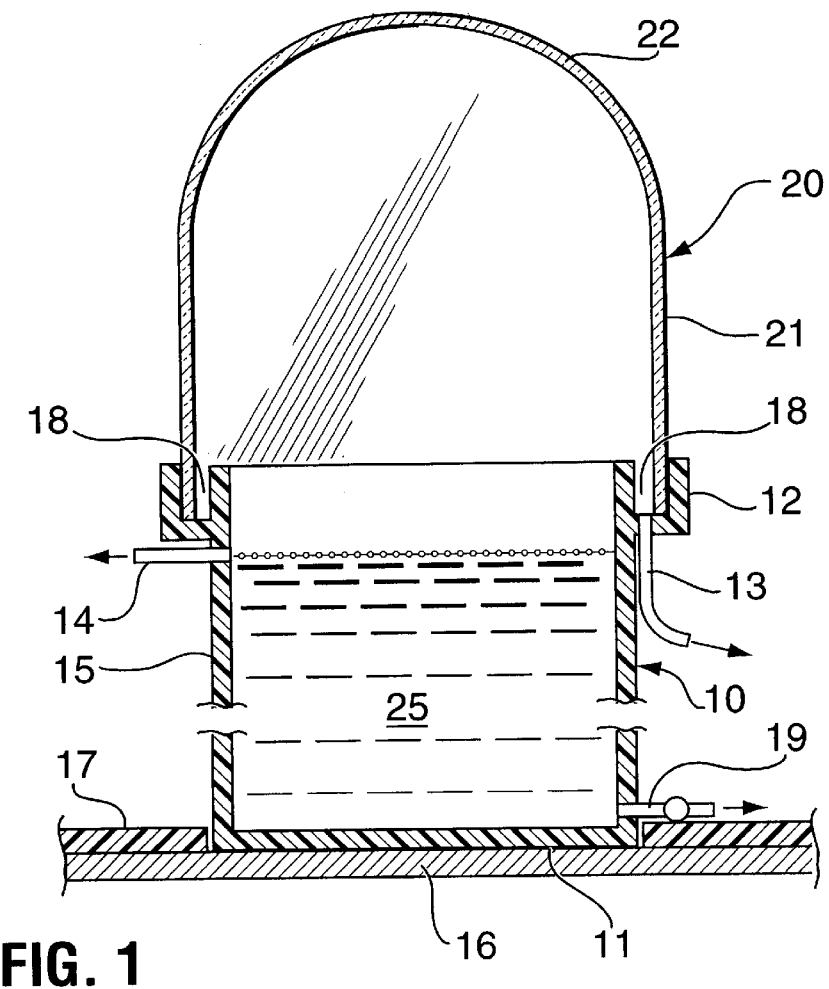
FIG. 1 is an elevation view in section showing a solar still of the invention.

In the various figures, like elements for the various embodiments are given like numeral designations. Referring particularly to FIG. 1, an individual solar still according to the invention comprises a cylindrical vessel or container 10 and a transparent cover 20. The container 10 is cylindrical in shape with vertical cylindrical side walls 15 and a bottom wall 11. The side walls 15 preferably are quite thin with a thickness of about 1 to 2 mm and are preferably made of a black plastic material or metal painted black on both the inside and outside. For the purposes of this invention, these units are relatively small, preferably having a diameter of about 2 to 4 feet (0.6 to 1.2 m). A particularly preferred unit has a diameter of about 3 feet (0.9 m).

Extending outwardly from an upper region of the side walls 15 is a projection 12 forming with the wall 15 and annular trough 18 extending around the periphery of the top of container 10. This trough is adapted to receive and hold the transparent cover 20 and also to receive and collect potable water. The potable water is collected through outlet 13.

An overflow outlet 14 controls the height of the salty water 25 contained within the vessel. The height of the outlet 14 above the bottom of the still is preferably greater than the diameter of the still. Floating on the surface of the salty water 25 is a layer 21 comprised of either particles of black plastic or black pumice or other mineral material or a porous or perforated plastic plate. A drain 19 is provided at the bottom of each container 10.

Each transparent plastic cover 20 is comprised of a cylindrical side wall portion 21 and a semi-spherical top portion 22.

Figure 3:
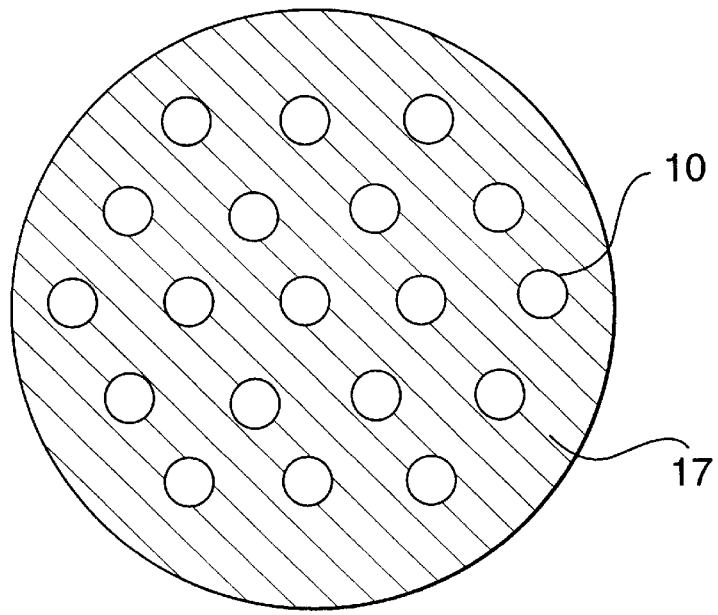
FIG. 3 is a plan view of a solar evaporation plant according to the invention.
Figure 2:
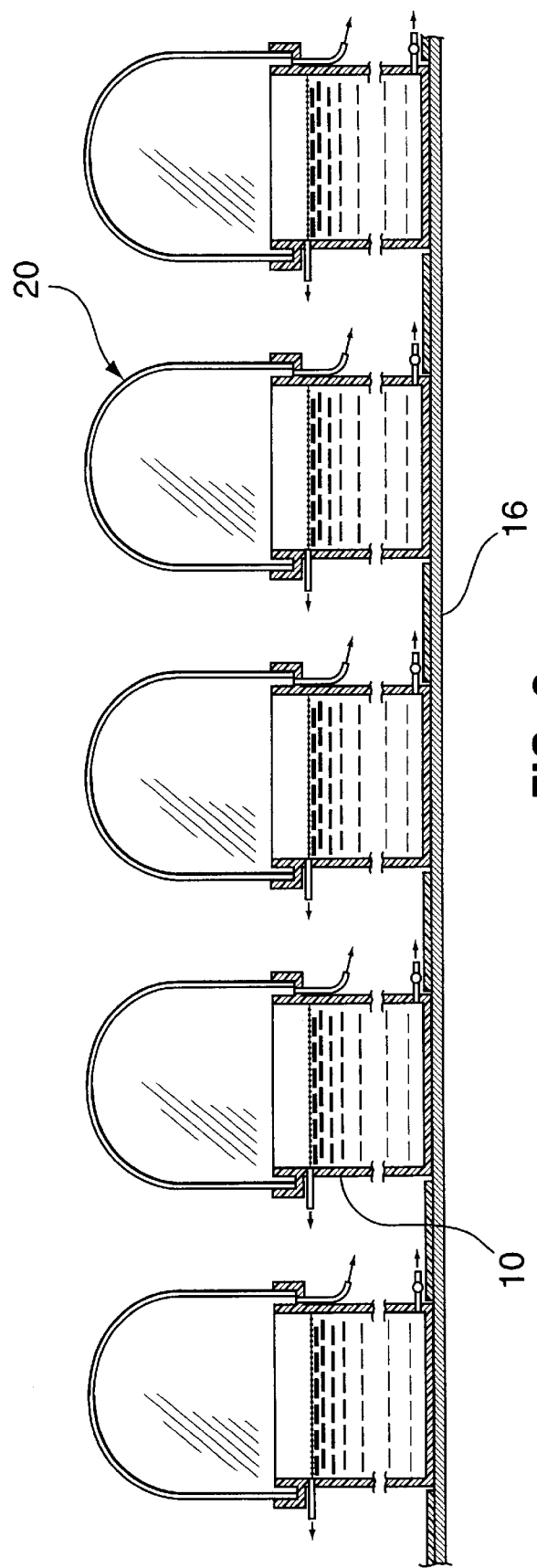
FIG. 2 is an elevation view in section showing a row of solar stills.

FIGS. 2 and 3 show how the solar power plant of the present invention is in fact an array of relatively small individual solar stills spaced from each other. They sit on a solid metallic heat conductor plate 16 which is covered by a black solar absorbing surface 17 between the individual solar stills.

The space between the individual solar stills resting on the plate 16 is preferably at least 1.35 times the total height of the salty water container. With the arrangement of stills according to this invention, it has been discovered that at all times of the year at least one half of the vertical areas of the covers and containers is exposed to solar radiation.

A particularly preferred installation consists of an arrangement as shown in FIG. 3 with an array of individual solar stills each having a diameter of about 3 feet (0.9 m) and the overflow outlet 14 located about 40 inches (1 m) above the bottom of the still. In the preferred installation, the transparent covers 20 have a total height which is greater than the diameter of the still and is preferably greater than the height of the overflow outlet above the floor of the still.

The solar evaporation plant of this invention is capable of providing distilled potable water from salty water with a high efficiency. Further, the apparatus of the invention is of a very simple design, and therefore distilled water can be produced at a low cost. Maintenance is also very simple. Because the apparatus can be operated without electricity, there is great freedom in selecting a site for the installation.

Example 1

A test was conducted using a solar still as shown in FIG. 1. It had a diameter of 3 feet and the salty water had a depth 40.62 inches.

The still was placed in the sunlight at 30° north latitude in AshdOod, Israel and the container was filled with salty water containing 35,000 mg/liter of salt. Particles of black pumice and plastic floated on the surface of the salty water.

The solar still produced over 65 liters of distilled potable water per day. This represents a production of over 9.19 liters of distilled potable water per square foot of salty water surface area.

It will be apparent that the equipment of the present invention may be employed in many different shapes, sizes and configurations. In view thereof, it should be understood that the particular embodiments of the invention shown in the drawings and described above are intended to be illustrative only and are not intended to limit the scope of the invention.

I claim:

1. A solar evaporation plant comprising a plurality of substantially equally spaced solar stills mounted on a black colored solid metallic heat conducting plate, each said solar still comprising:

(a) a vertical, cylindrical container having a diameter of about 2 to 4 feet for holding a body of salty water in which the salty water has an exposed upper surface, said container having thin side walls with the inside and outside faces thereof being colored black;

(b) an overflow in the container side wall for controlling the depth of salty water at a level that is greater than the diameter of container;

(c) a floating cover layer on said body of salty water comprising a black colored floating perforate plate or black colored floated particles;

(d) an annular trough surrounding the top periphery of said cylindrical container, said trough serving to hold a transparent cover for the container and to collect condensed water; and (e) a transparent plastic cover mounted in said annular trough, said cover comprising a lower vertical cylindrical portion which merges into a semi-spherical top portion, said transparent cover having a height greater than its diameter for condensing water vapor and causing the condensed water to flow down the vertical cylindrical portion for collection in said annular trough.

2. A solar evaporation plant according to claim 1 wherein the plurality of solar stills are spaced from each other by a distance of at least 1.35 times the total height of the salty water container.

3. A solar evaporation plant according to claim 2 wherein the cylindrical containers for salty water have a wall thickness of about 1 to 2 mm.

4. A solar evaporation plant according to claim 3 wherein the cylindrical containers for salty water are formed of a black plastic material or metal painted black.

5. A solar evaporation plant according to claim 3 wherein the floating cover layer on the salty water comprises a black colored floated porous plastic plate.

6. A solar evaporation plant according to claim 3 wherein the floating cover layer on the salty water comprises floating black plastic particles.

7. A solar evaporation plant according to claim 3 wherein the floating cover layer on the salty water comprises floating particles of black pumice.

8. A solar evaporation plant according to claim 3 wherein each said solar still cylindrical container has a diameter of about 3 feet.

9. A solar evaporation plant according to claim 8 wherein the overflow for controlling the depth of salty water is at a height of about 40 inches above the bottom of the still.

10. A solar evaporation plant according to claim 1 wherein the transparent cover further has a height greater than the height of the cylindrical salty water container.

* * * * *